(12) United States Patent
Leng et al.

(10) Patent No.: US 11,133,658 B2
(45) Date of Patent: Sep. 28, 2021

(54) CABLE MOUNTING DEVICE AND CABLE CLAMP THEREOF

(71) Applicants: Maxdao Limited, La Canada Flintridge, CA (US); Jiangsu Maxdao Communication Technology Co., Ltd., Jiangsu (CN)

(72) Inventors: Junhua Leng, Taizhou (CN); Gang Li, Taizhou (CN)

(73) Assignees: Maxdao Limited, La Canada Flintridge, CA (US); Jiangsu Maxdao Communication Technology Co., Ltd., Jiangsu (CN)

( * ) Notice: Subject to any disclaimer, the term of this patent is extended or adjusted under 35 U.S.C. 154(b) by 0 days.

(21) Appl. No.: 16/706,784

(22) Filed: Dec. 8, 2019

(65) Prior Publication Data

US 2020/0185899 A1  Jun. 11, 2020

Related U.S. Application Data

(60) Provisional application No. 62/787,360, filed on Jan. 1, 2019.

(30) Foreign Application Priority Data

Dec. 7, 2018 (CN) .......................... 201822056903.8

(51) Int. Cl.
| | | |
|---|---|---|
| *H02G 3/32* | (2006.01) | |
| *F16L 3/22* | (2006.01) | |
| *F16L 3/13* | (2006.01) | |
| *F16L 3/223* | (2006.01) | |
| *H02G 3/04* | (2006.01) | |
| *F16L 3/10* | (2006.01) | |
| *F16L 3/133* | (2006.01) | |

(52) U.S. Cl.
CPC .................. *H02G 3/32* (2013.01); *F16L 3/13* (2013.01); *F16L 3/221* (2013.01); *F16L 3/1075* (2013.01); *F16L 3/133* (2013.01); *F16L 3/222* (2013.01); *F16L 3/223* (2013.01); *H02G 3/0456* (2013.01)

(58) Field of Classification Search
CPC ..... F16L 3/13; F16L 3/221; F16L 3/14; F16L 3/133; F16L 3/22; F16L 3/222; F16L 3/24; F16L 3/26; H02G 3/32; F16G 11/10; F16G 11/105; F16G 11/106
See application file for complete search history.

(56) References Cited

U.S. PATENT DOCUMENTS 2,166,916 A * 7/1939 Lombard ................ F16B 2/245
248/73
8,235,332 B2 * 8/2012 Cesarino ............... F16L 3/1233
248/74.5

(Continued)

*Primary Examiner* — Tan Le
(74) *Attorney, Agent, or Firm* — Raymond Y. Chan; David and Raymond Patent Firm (57) ABSTRACT

A cable clamp, for mounting at least one cable, includes a clamping base, which has a through hole, at least two supporting arms, wherein each of said supporting arms is extended from said clamping base and at least two holding arms disposed intervally to form a holding cavity therebetween, wherein said holding cavity is between said supporting arms for securing said cable, wherein said holding arms of said cable clamp is adapted to engage with said through hole of said adjacent cable clamp so as to arrange two of said cable clamps overlappedly.

19 Claims, 6 Drawing Sheets

(56) References Cited

U.S. PATENT DOCUMENTS

| | | | | |
|---|---|---|---|---|
| 8,829,353 B2* | 9/2014 | Homner | ............... | H01B 17/14 |
| | | | | 174/161 R |
| 10,637,226 B2* | 4/2020 | Bell | ............... | H02G 3/32 |
| 10,663,088 B2* | 5/2020 | Vaccaro | ............... | H02G 3/32 |
| 10,823,312 B2* | 11/2020 | Vaccaro | ............... | F16L 3/133 |
| 2002/0066833 A1* | 6/2002 | Ferrill | ............... | H02G 3/32 |
| | | | | 248/62 |
| 2005/0109887 A1* | 5/2005 | Catapano | ............... | F16L 3/222 |
| | | | | 248/68.1 |
| 2011/0226913 A1* | 9/2011 | Feige | ............... | F16L 3/12 |
| | | | | 248/74.2 |

* cited by examiner

CABLE MOUNTING DEVICE AND CABLE CLAMP THEREOF

CROSS REFERENCE OF RELATED APPLICATION

This application is a non-provisional application that claims the benefit of priority under 35 U.S.C. § 120 to a provisional application, application No. 62/787,360, filed Jan. 1, 2019, and under 35 U.S.C. § 119 to a Chinese application, application number CN201822056903.8, filed Dec. 7, 2018, which are incorporated herewith by references in their entities.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to electrical cable installation, and more particularly to a cable mounting device and a cable clamp thereof.

Description of Related Arts

In engineering and construction, a large number of cables are required to be used for the infrastructure of communication and power supply. Each of the cables needs to be fixed to an electrical equipment or a tube for installation in the outside, for example a tower. A conventional cable clamp is used to secure the cables to the tower. Installation of cables is inconvenient when it requires high-altitude operation, and even long-term operation at high altitude, which poses a threat to the health and safety of workers. Therefore, the efficiency and safety of cable installation is very important.

When each of the cables is mounted on the tower, each of the cable clamps is required to be mounted with the cable in proper place. There are a large number of cables required to be installed with proper mounting direction and proper mounting position so that the cables can be mounted in order. Without considering direction or position, the cables are winding to adversely affect the efficiency and security of electricity. Therefore, the position and direction of each cable while mounting are very important. In some special requirements, it is necessary to maintain a certain distance between adjacent cables to avoid mutual interference.

Considering some kinds of the conventional cable clamps currently in use, they are usually in metal fixtures. But the metal will cause electromagnetic interference to the cables and affect the function of the cables.

In addition, tools are necessary to mount cables on the tower, for example screwdrivers or hammers. But during high-altitude operation, it is inconvenient to carry so many tools. When using tools at high altitudes, accidental handling can cause the tools to fall from high altitudes, which is very dangerous for people and property on the ground. Moreover, the workers need to carry all stuffs and wear completely safeguard measures during high-altitude operation, like all the safety ropes, so that the movement of workers is restricted. And complicated working operation of workers will greatly extend the operation time. With longer time, there is more opportunity to have risks with less concentrations of workers.

SUMMARY OF THE PRESENT INVENTION

The invention is advantageous in that it provides a cable mounting device and cable clamp thereof, wherein the cable mounting device is capable of rapidly securing a cable.

Another advantage of the invention is to provide a cable mounting device and cable clamp thereof, wherein the cable mounting device comprises at least one mounting base and at least one cable clamp, wherein the mounting base is attached to at least one supporter, wherein the cable is caught by cable clamp, wherein the cable clamp is mounted on the mounting base, so that the cable is rapidly and conveniently secured to the supporter stably.

Another advantage of the invention is to provide a cable mounting device and cable clamp thereof, wherein the cable is fixed with a predetermined direction inside the cable clamp according to the needs of installation.

Another advantage of the invention is to provide a cable mounting device and cable clamp thereof, wherein the cable clamp has strongly holding ability to ensure the cable stably mounted.

Another advantage of the invention is to provide a cable mounting device and cable clamp thereof, wherein the cable clamp provides a holding cavity to secure the cable therein, such that the cable clamp with the cable is secured corresponds to the supporter.

Another advantage of the invention is to provide a cable mounting device and cable clamp thereof, wherein the cable clamp comprises a supporting arm and a holding arm, wherein the holding arm is supported by the supporting arm to hold the cable in place to ensure the stability of the cable.

Another advantage of the invention is to provide a cable mounting device and cable clamp thereof, wherein the cable clamp is in symmetrical structure which is easy to manufacture.

Another advantage of the invention is to provide a cable mounting device and cable clamp thereof, wherein the cable clamp comprises at least two holding arms, and the holding arms are symmetrically disposed to each other, wherein each of the holding arms has a mounting end, wherein a mounting opening is formed between the mounting ends of the holding arms, wherein the holding cavity is extended from the mounting opening to the other end of the holding arms to be formed, wherein the cable is entered from the mounting opening into the holding cavity to be caught by the holding arms, so that with mounting the cable clamp, the cable and the cable clamp are installed with each other easily.

Another advantage of the invention is to provide a cable mounting device and cable clamp thereof, wherein after the cable is stably mounted on the cable clamp, the wire arrangement of the cables is adjustable by operating the cable clamps.

Another advantage of the invention is to provide a cable mounting device and cable clamp thereof, wherein the mounting end of the cable clamp is secured to be installed through a through hole, so that the installation of the cable clamp can be completed by simply pressing.

Another advantage of the invention is to provide a cable mounting device and cable clamp thereof, wherein the clamping base of the cable clamp has a through hole, wherein the cable clamp is mounted on the clamping base of the other cable clamp by the mounting end entering the clamping base of the other cable clamp through the through hole, wherein the mounting end is shaped in a barb to effectively prevent the mounting end from falling off from the other clamping base.

Another advantage of the invention is to provide a cable mounting device and cable clamp thereof, wherein the cable is secured to the cable clamp by being simply pushed into the holding cavity, and the cable will not fall out from the mounting opening to ensure the reliability of installation operation and the stability of the cables.

Another advantage of the invention is to provide a cable mounting device and cable clamp thereof, wherein the holding arm having a free end, wherein the free ends of two of the holding arms have a gap formed between the holding arms which are relatively free, wherein when the cable is pressed on the mounting opening into the holding cavity, the mounting ends are squeezed to move for the cable, wherein the cable is caught between the holding arms in the holding cavity, which is operatable in a manual manner.

Another advantage of the invention is to provide a cable mounting device and cable clamp thereof, wherein one end of the cable clamp is provided with at least one first connecting member, wherein the first connecting member is detachably connected to the mounting base to detachably mount the cable clamp on the mounting base such that the connection between the cable clamp and the mounting base is easily accomplished in a manual manner.

Another advantage of the invention is to provide a cable mounting device and cable clamp thereof, wherein the mounting end of the cable clamp may be pressed through the through hole of the other cable clamp to be fixed, such that at least two of the cable clamps may be vertically overlappedly secured with each other, reducing the space occupied on surface of the supporter to organize the cables clearly.

Another advantage of the invention is to provide a cable mounting device and cable clamp thereof, wherein the other end of the cable clamp is provided with at least one second connecting member, wherein the second connecting member is detachably connected to the first connecting member of the other cable clamp, wherein the cable clamps can be vertically straightly installed by the first connecting member of the cable clamp connecting the second connecting member of the other cable clamp.

Another advantage of the invention is to provide a cable mounting device and cable clamp thereof, wherein the installation of the cable has no needs of tools, like screwdrivers, which is easy to operate.

Another advantage of the invention is to provide a cable mounting device and cable clamp thereof, wherein when the cable clamps are secured overlappedly, the spacing of the adjacent cable clamps can be controlled for safety protection to ensure usage of the cables.

Another advantage of the invention is to provide a cable mounting device and cable clamp thereof, wherein the efficiency of installing the cables to the supporter is highly improved to reduce the operation time of workers at high altitude to protect the worker.

Another advantage of the invention is to provide a cable mounting device and cable clamp thereof, wherein the cable clamp is made of plastic, having no electromagnetic interference on the cables.

Another advantage of the invention is to provide a cable mounting device and cable clamp thereof, wherein the cable clamp is made by an injection molding process with high production efficiency.

Additional advantages and features of the invention will become apparent from the description which follows, and may be realized by means of the instrumentalities and combinations particular point out in the appended claims.

According to the present invention, the foregoing and other objects and advantages are attained by a cable clamp, for mounting at least one cable, comprising:

a clamping base;

at least two supporting arms; and at least two holding arms, wherein each of the supporting arms is extended from end of the clamping base toward the same side thereof, wherein a passage is formed between the supporting arms, wherein the holding arms are disposed around the passage, wherein the two cable clamps are secured overlappedly by the holding arms of the cable clamps engaging with the passage of the adjacent cable clamp.

According to the present invention, the foregoing and other objects and advantages are attained by a cable mounting device for mounting at least one cable, comprising:

at least one cable clamp, comprising at least one first connecting member and at least two holding arms, wherein the first connecting member is disposed at one end of the holding arms; and at least one mounting base having at least one through hole, wherein when the cable clamp is mounted on the mounting base by the holding arms of the cable clamps engaging with the through hole of the mounting base.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to one skilled in the art. The general principles defined in the following description would be applied to other embodiments, alternatives, modifications, equivalents, and applications without departing from the spirit and scope of the present invention.

Figure 1:
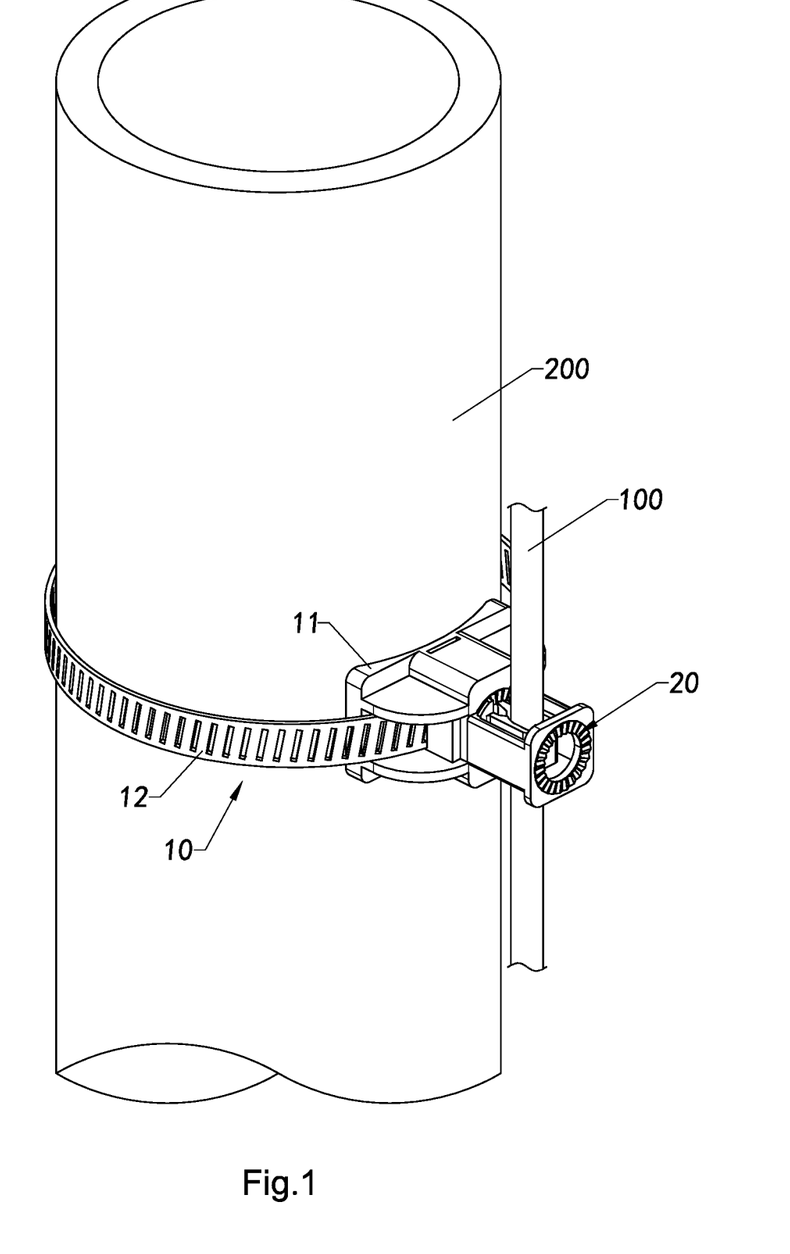
FIG. 1 is a perspective view of according to a preferred embodiment of the present invention, illustrating a cable mounting device secured on a supporter.

As shown in FIGS. 1-7 of the present invention, a cable clamp and a cable mounting device is disclosed an embodiment in the following description. As shown in FIG. 1, the cable mounting device comprises at least one mounting base 10 and at least one cable clamp 20, wherein the mounting base 10 is secured around at least a supporter 200 on the outer surface of the supporter 200.

The cable clamp 20 is detachably mounted on the mounting base 10. A cable 100 is caught by the cable clamp 20, and when the cable clamp 20 is mounted on the mounting base 10, the cable 100 is mounted on the supporter 200 so that the cable 100 was installed. In this embodiment, the supporter 200 is illustrated in the form of a circular tube. It will be understood by one skilled in the art that the shape of the supporter 200 is not limited to a cylinder according to different requirements, but the mounting base 10 can be secured on the outer surface of the supporter 200 by a tie or a glue and the like.

Figure 2:
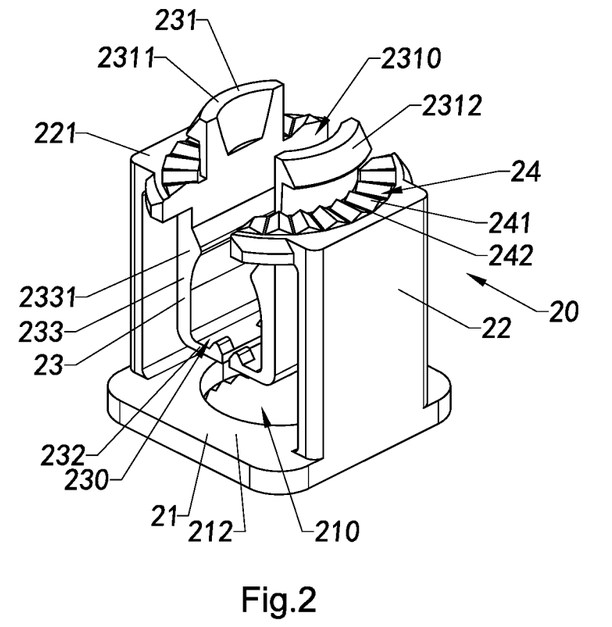
FIG. 2 is a perspective view of the above preferred embodiment of a cable clamp of the cable mounting device of present invention.
Figure 3:
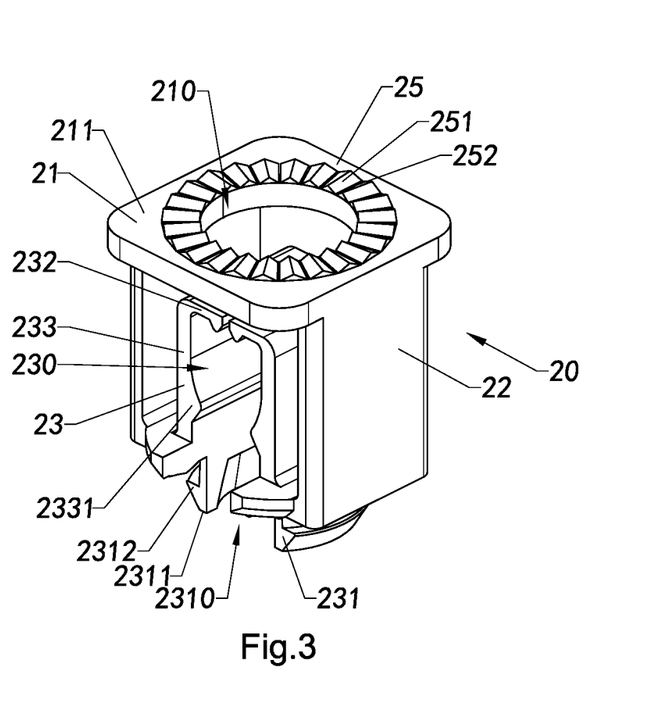
FIG. 3 is a perspective view of the above preferred embodiment of a cable clamp of the cable mounting device of present invention.

Referring to FIGS. 2 and 3, the cable clamp 20 comprises a clamping base 21 and at least two supporting arms 22, wherein the supporting arms 22 are formed by extending from end of the clamping base 21 towards the same side thereof. The two supporting arms 22 are disposed correspondingly with an interval space therebetween.

The cable clamp 20 further comprises at least two holding arms 23, wherein each of the holding arm 23 is provided relatively on the inside of the supporting arm 22 with the holding arm 23 facing to the other to form a holding cavity 230 between the holding arms 23.

Each of the holding arms 23 having a mounting end 231, wherein the mounting end 231 is extended from the end of the supporting arm 22 to be exposed to the outside of the cable clamp 20. The mounting ends 231 of the holding arms 231 is formed outside a supporting end of the supporting arm 21. A mounting opening 2310 is formed between the facing mounting ends 231, and the mounting opening 2310 is communicated with the holding cavity 230.

The holding arm 23 further has two movable ends 232 formed and extended from the mounting end 231 towards the clamping base 21. There is a certain distance between the movable end 232 and the clamping base 21. Two movable ends 232 are facing each other with a gap therebetween for moving the movable ends 232.

The holding arm 23 comprises a clamping body 233 formed between the mounting end 231 and the movable end 232 for holding the cable 100 therebetween. The holding arm 23 has at least one stopper wall 2331 protrudedly extended from the clamping body 233 to the holding cavity 230. In this embodiment, there are two of the stopper walls 2331 symmetrically provided with a gap therebetween for holding the cable 100.

The supporting end 221 of supporting arm 22 is at one side of the supporting arm 22. The other end of the supporting arm 22 is connected with the clamping base 21. The supporting end 221 is protruded from the supporting arm 22 towards the inner side of the cable clamp 20.

On both sides of the supporting arms 22 are disposed facingly, and the holding arms 23 are provided on the inner side of the relative supporting arms 22. The mounting ends 231 of the holding arms 23 are disposed at the outer side of the support end 221. The holding arm 23 and the supporting arm 22 are connected at the support end.

In other words, the holding arms 23 moves relatively with the support end 221 as a fulcrum to facilitate mounting of the cable 100 by catching with the supporting arms 22.

Figure 4:
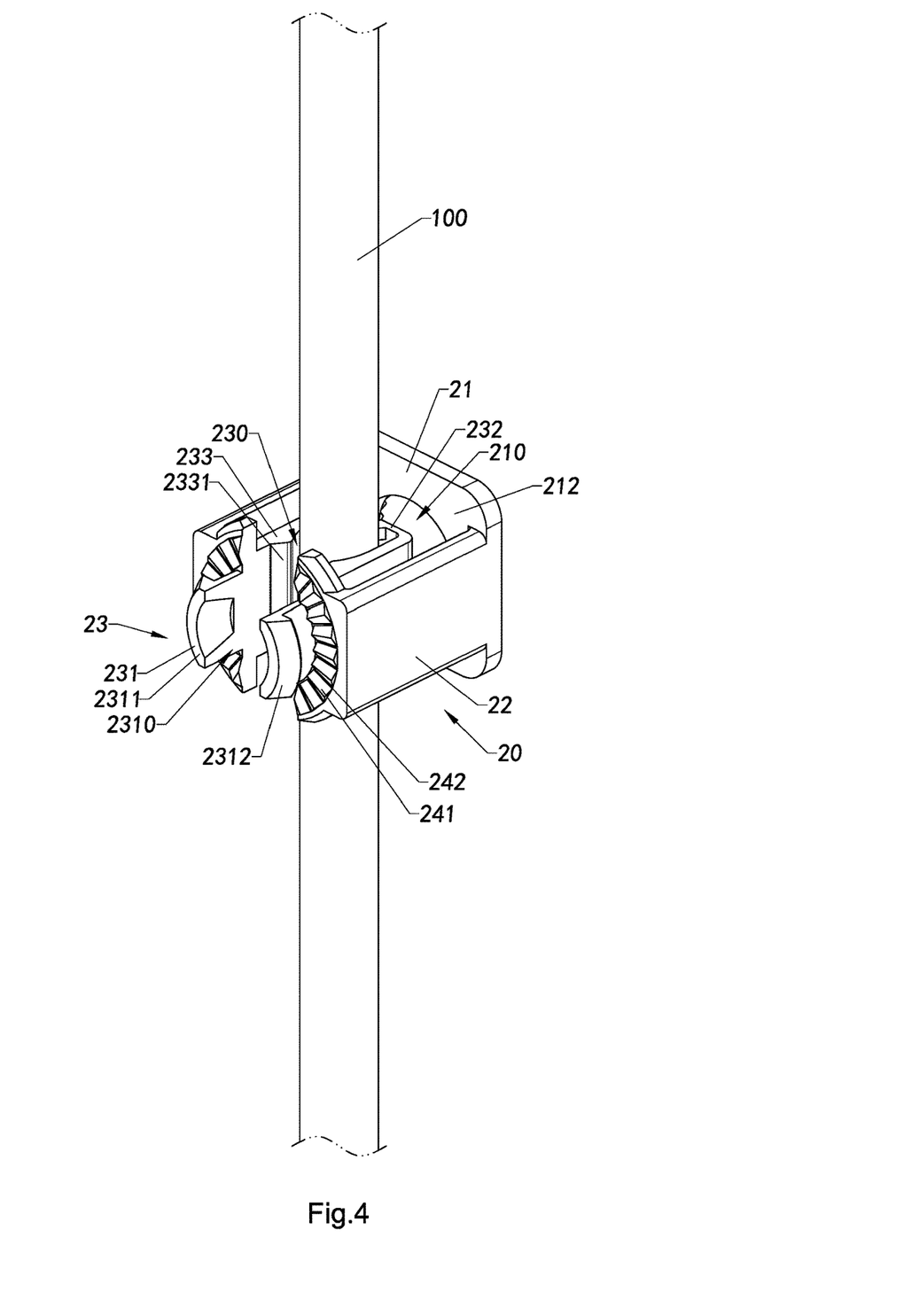
FIG. 4 is a perspective view of the above preferred embodiment of present invention, illustrating a cable clamp of the cable mounting device mounted with a cable.

Aligning the mounting opening 2310 with the cable 100, and pressing into the cable clamp 20, the mounting ends 231 of the holding arms 23 are pressed to open the mounting opening 2310, the cable 100 enters into the holding cavity 230 along the mounting opening 2310. When the cable 100 is passed through the mounting opening 2310, the mounting ends 231 are not squeezed any more to be back to the original shape with the mounting opening 2310 restored to its original size. The cable 100 enters the holding cavity 230 to be caught. The cable clamp 20 is mounted with the cable 100, and the cable clamp 20 secures the cable 100 in place.

The stopper walls 2331 are narrow down the gap in the holding cavity 230. And the holding cavity 230 can be defined as two part, one part from the mounting end 231 to the stopper walls 2331, the other part from the stopper walls 2331 to the movable end 232.

The cable 100 is entered into the holding cavity 230 from the opening 2310 to reach the stopper walls 2331. The cable 100 is pressing against the holding body 2331, and the holding body 233 is moved to the supporting arm 22 to enlarge the gap between the stopper walls 2331. The cable 100 is squeezed between the stopper walls 2331 and left, so that the stopper walls 2331 is not pressed to move back to original place.

The stopper walls 2331 narrowed the opening 2310 to prevent the cable 100 from leaving the holding cavity 230. The cable 100 is holding in the part from the stopper walls 2331 to the movable end 232, and the stopper walls 2331 is preventing the cable 100 from escaping from the mounting end 231.

The cable clamp 20 further comprises at least one first connecting member 24 and at least one second connecting member 25, wherein the first connecting member 24 and the second connecting member 25 are provided on different ends of the cable clamp 20. The first connecting member 24 of the cable clamp 20 and the second connecting member 25 of the other cable clamp 20 can be matingly coupled to each other. The first connecting member 24 is adapted to engage with the second connecting member 25 so as to arrange two cable clamps 20 in an end-to-end manner.

The first connecting member 24 is provided on the support end 221 of the supporting arm 22. Preferably, the first connecting member 24 is disposed at the support end 221 along the holding arm 23 on the exposed portion of the support end 221 of the supporting arm 22.

The first connecting member 24 comprises at least one first projection 241 and at least one recess 242 placed adjacent with the first projection 241. The first projection 241 is extended from the supporting end 221. And the second connecting member 25 comprises at least one projection 251 and at least one recess 252 placed adjacent with the second projection 252 respectively with the first recess 242 and the first projection 241. With the projections attached on the recesses, the first connecting member 24 of one cable clamp 20 is stably engaged with the second connecting member 25 of the other cable clamp 20.

The second connecting member 25 is provided on the outer surface of the clamping base 21. The clamping base 21 has an outer surface 211. The second connecting member 25 is provided on the outer surface 211.

Figure 6:
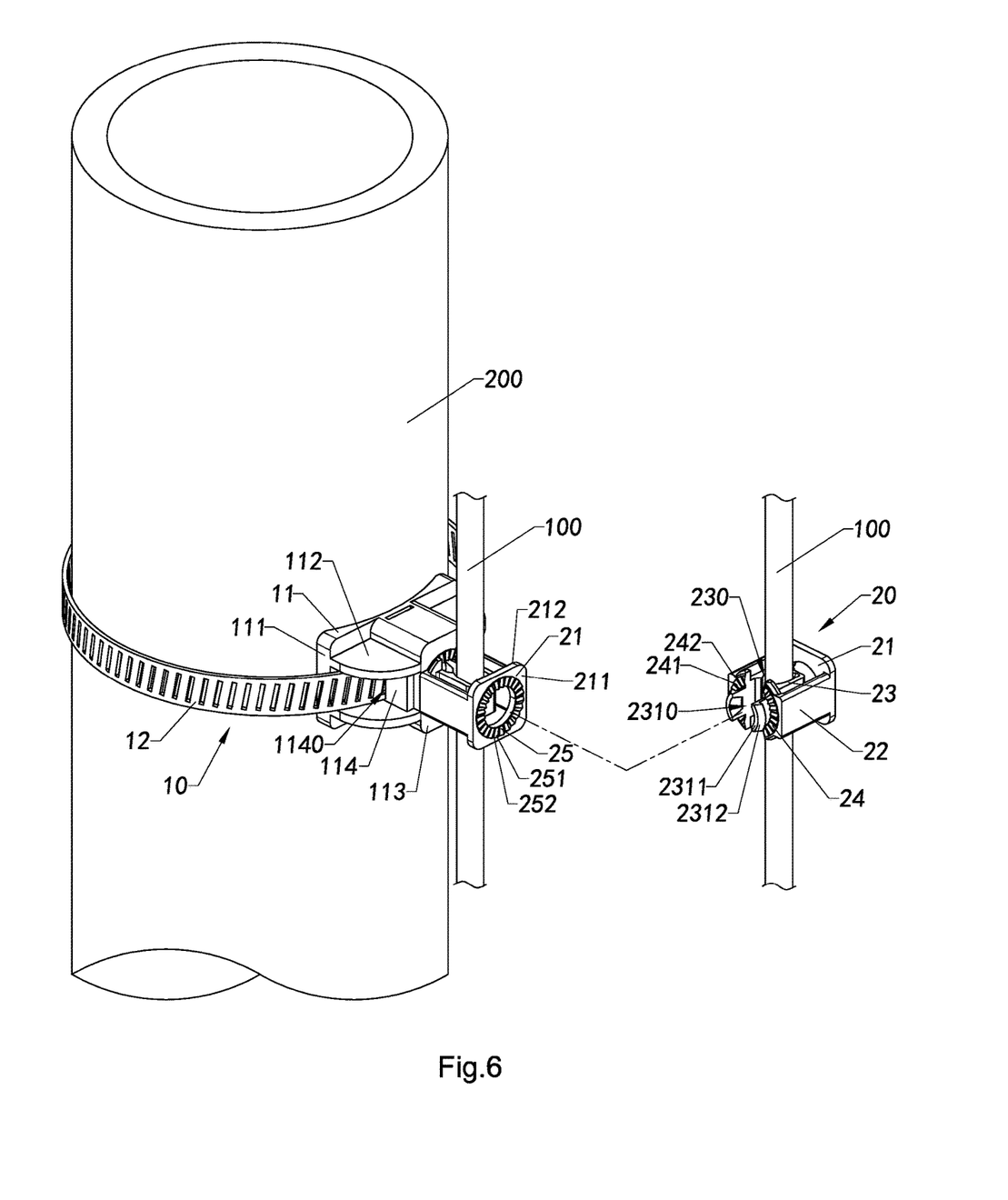
FIG. 6 is a perspective view of the above preferred embodiment of present invention, illustrating the cable clamp overlapped mounted on the other cable clamp.

The cable clamps 20 can be mounted in an overlapped manner. When the cable clamp 20 is mounted on the other cable clamp 20, the first connecting member 24 of the other cable clamp 20 and the second connecting member 25 are connected with each other. Preferably, the first connecting member 24 and the second connecting member 25 are engaged with each other so that the cable clamp 20 and the other cable clamp 20 are connected and secured. The cable clamps 20 can be vertically overlappedly installed.

The cable clamp 20 is provided with a through hole 210, and the through hole 210 is communicated with the interior and the outer of the cable clamp. Preferably, the through hole 210 is provided on the clamping base 21. The recesses 252 of the second connecting member 25 are disposed on the outer surface 211 along the periphery of the through hole 210, and the protrusion 251 of the second connecting member 25 are evenly spaced on the periphery of the through hole 210.

When the cable clamps 20 are mounted overlappedly, the first connecting member 24 and the second connecting member 25 is engaged.

Since the mounting end 231 of the supporting arm 22 is exposed from the support end 221 of the supporting arm 22, when the supporting end 221 is pressed against the outer surface 211 of the clamping base 21, the mounting end 231 is extended into the inside of the cable clamp 20 through the through hole 210. By providing the through hole 210, the protruding mounting end 231 can enter the inside of the other cable clamp 20, so that the first connecting member 24 and the second connecting member 25 are fixedly engaged, The installation between the cable clamps 20 is ensured to be secured and stable.

The mounting end 231 comprises a first end 2311 and a second end 2312. The first end 2311 is extended and formed from the supporting end 221 towards the outer of the cable clamp 20. The second end 2312 is formed from the first end 2311 in an angle backwardly. In other words, the mounting end 231 is shaped as hook.

When the first connecting member 24 of one cable clamp 20 is engaged with the second connecting member 25 of the other cable clamp 20, the mounting end 231 of one cable clamp 20 is engaged into the though hole 210 of the other cable clamp 20. The second end 2312 of one cable clamp 20 is pressed on the inner surface 212 of the clamp base 21 of the other cable clamp 20.

The mounting end 231 is barbedly shaped, preventing the cable clamp 20 detaching from the other overlapped cable clamp 20.

The thickness of the clamp base 21 is adapted with the distance between the second end 2312 and the supporting end 221.

The mounting end 231 is shaped with an inclined surface. When the mounting end 231 is slid into the inside of the other cable clamp 20 from the through hole 210, the clamping base 21 is engaged between the mounting end 231 and the supporting end 221.

When mounting the cable 100 on the cable clamp 20, pressing the cable 100 to the mounting opening 210 and into the cable clamp 20. The cable 100 is entering into the clamping cavity 230 through the mounting opening 210. By single operation, the cable 100 is stably hold by the cable clamp 20.

Each of the cable clamps 20 respectively caught one of the cables 100 in the embodiment. By adjusting the number of the stacked cable clamps 20, the number of the cables 100 can also be adjusted.

The cable 100 is clamped in the holding cavity 230 of the respective cable clamp 20. The cables 100 clamping in the adjacent cable clamps 20 have a certain spacing, to prevent the cables 100 cross-wounding.

The cable 100 is caught inside the holding cavity 230, and the direction of the cable 100 is fixed relative to the cable clamp 20. Different cable clamps 20 can be adjusted in orientation when mounted. In particular, as mounting the cable clamps 20 overlappedly, rotating one of the cable clamp 20, the first connecting member 24 of the cable clamp 20 and the second connecting member 25 of the other cable clamp 20 are still engaged. However, the relative position between the cable 100 caught by the cable clamp 20 and the cable 100 caught by the other cable clamp 20 is changed. That is, by adjusting the direction of the mounted cable clamp 20, the direction of the cable 100 can be adjusted without touching the cables 100, such that the cables 100 caught by the two adjacent cable clamps 20 may be extended in the same direction or in different directions.

With the first connecting member 24 and the second connecting member 25, the directions of the adjacent cables 100 can be settled while mounting. For example, when requiring the angle between the cables needed to be a right angle, the first connecting member 24 and the second connecting member 25 can be positioned with the adjacent cable clamps 20 to be mounted in a right angle. With the special connecting members, the cable clamps 20 are adapted to be compatible in a directional cable fixation. Preferably, the first connecting member 24 and the second connecting member 25 are shaped as gear with recesses and projections so that the first connecting member 24 and the second connecting member 25 can be positioned with each other to be stabled. The first connecting member 24 has at least one first projection 241 and at least one first recess 242. The second connecting member 25 has at least one second projection 251 and at least one second recess 252. In this embodiment, the first connecting member 24 and the second connecting member 25 are shaped around a circle, so that any angle between the cable clamps 20 can be fixed without winding by workers during installation operation.

As the cable clamp 20 is holding the cables 100 in the holding cavity 230, the cable 100 is relatively fixed in position in the cable clamp 20. When the other cable clamp 20 hold the other cable 100 is mounted overlapped on the cable clamp 20, and the two cable clamps 20 are fixedly connected to each other. The cables 100 in the holding cavity 230 of the cable clamp 20 are respectively fixed in a distance. When a plurality of cable clamps 20 hold the cables 100 are secured overlappedly, the distance between the adjacent cables 100 inside the adjacent cable clamp 20 are the same.

The cable clamp 20 stably holds the cable 100 in a fixed position, so that when two or more of the cable clamps 20 are installed, the cable 100 inside the cable clamps 20 are respectively mounted equidistantly.

The relative cable clamp 20 clamped with the cable 100 is connected with the mounting base 10, so that a plurality of the cable 100 in a certain arrangement is mounted on the supporter 200.

Figure 5:
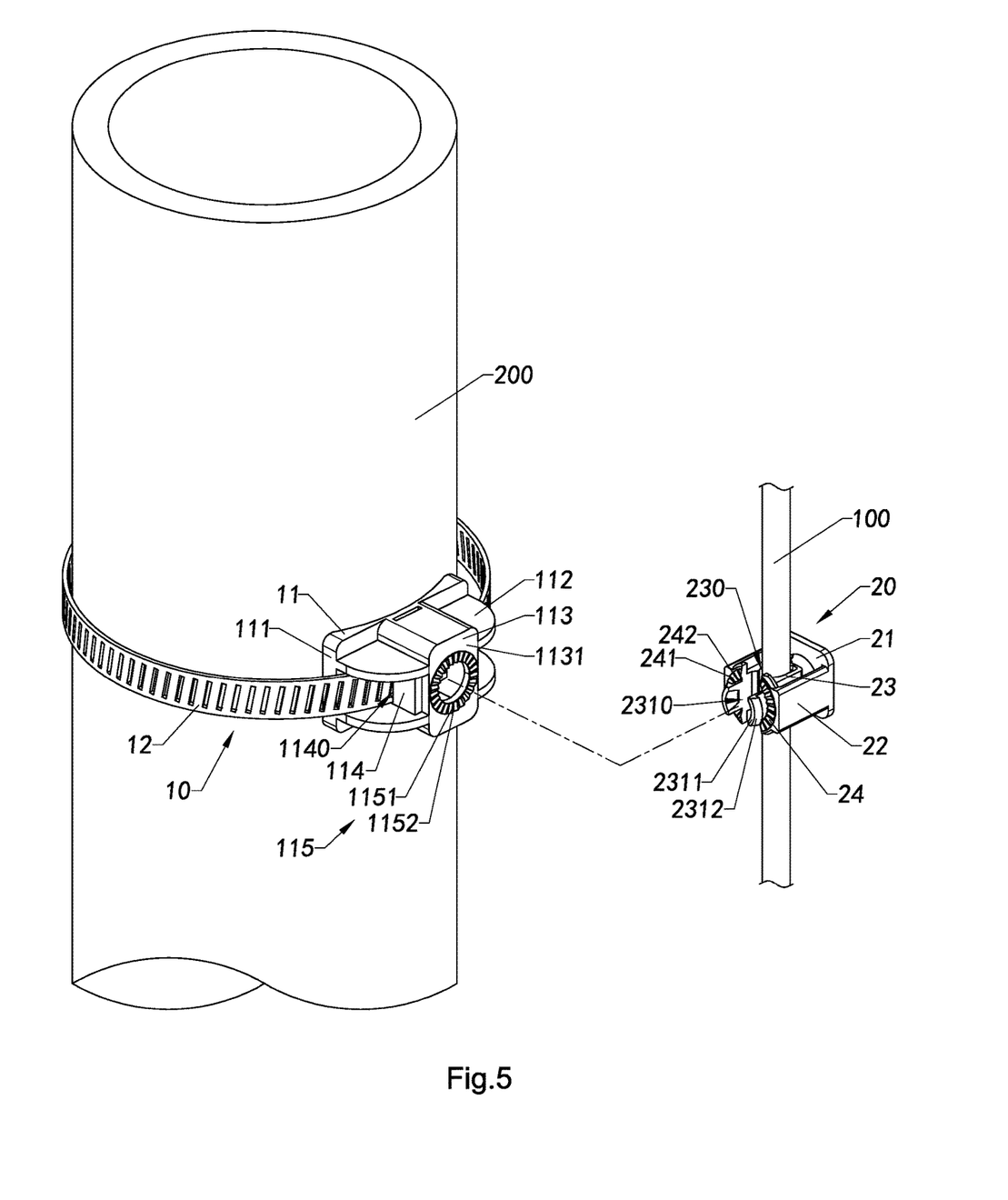
FIG. 5 is a perspective view of the above preferred embodiment of present invention, illustrating the cable clamp mounted on a mounting base of the cable mounting device.
Figure 7:
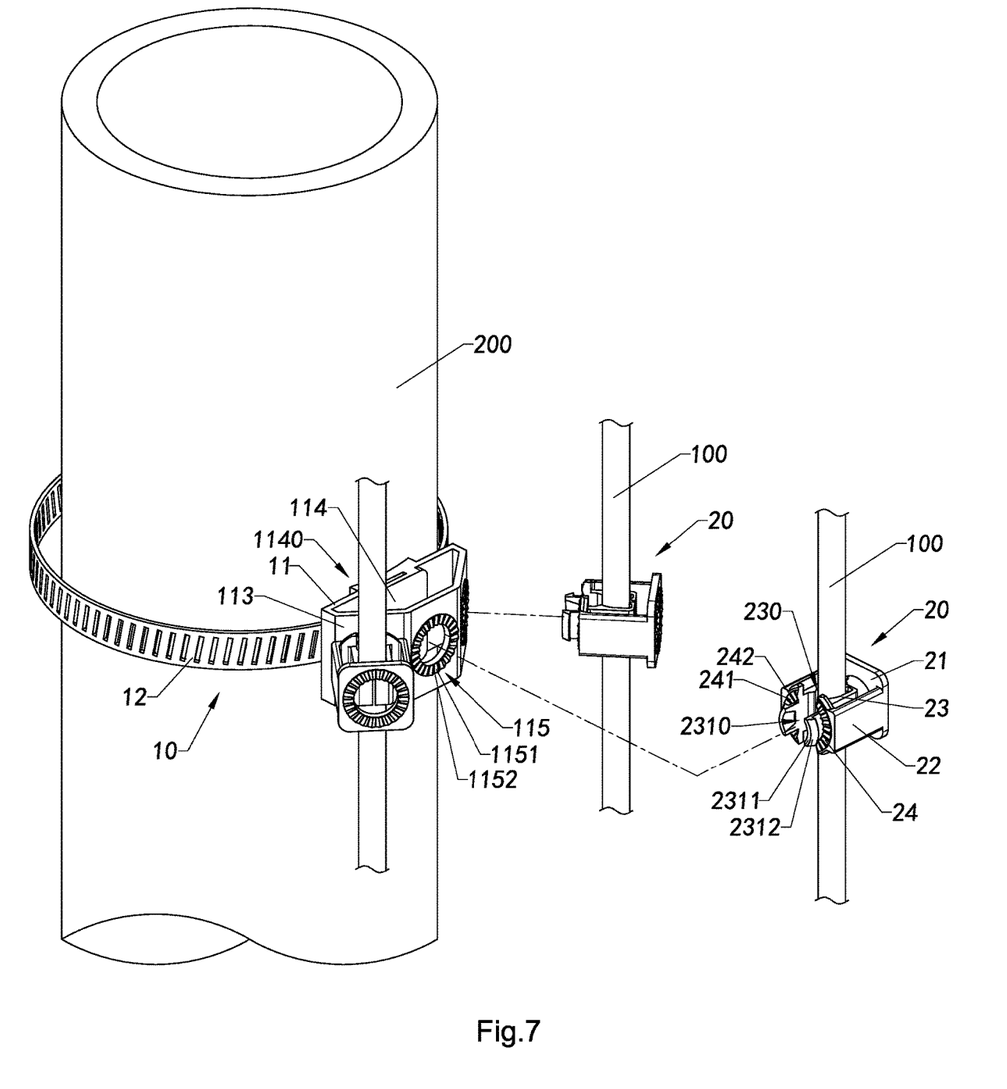
FIG. 7 is a perspective view of an alternative mode of the above preferred embodiment of the cable mounting device of present invention

The mounting base 10 has at least one connecting hole 1130. The connecting member hole 1130 is connected with the outside of the mounting base 10 and the inside of mounting base 10. The mounting base 10 further comprises the second connecting member 25 on the top surface around the hole 1130. For clearly description, a third connecting member 115 of the mounting base 10 is similar as the second connecting member 25 to connect the cable clamp 20, as shown in FIGS. 5-7.

During installation, the mounting base 10 is secured on the support 200 through a fixing belt 12. The mounting base 10 is fixed on the supporter 200. The cable clamp 20 holding the cable 100 is engaged with the mounting base 10 by the first connecting member 24 and the second connecting member 25. Preferably, the cable clamp 20 holding the cable 100 is engaged with the mounting base 10 by the mounting end 231 engaging inside the thought hole 1130. In other words, the cable 100 is pressed into the cable clamp 20 to be mounting on the mounting base 10 firstly, and then the cable clamp 20 is pressed into the mounting base 10 as shown in FIG. 5. Or then the cable clamp 20 is pressed into the other cable clamp 20 as shown in FIG. 6.

The mounting base 10 comprises a fixing base 11 adapted for securing plurality of the cable clamps 20. The fixing base 11 comprises a bottom wall 11, at least two side walls 112 and a top wall 113. Each of side wall 112 is formed integrally from the bottom wall 111, and the top wall 113 is formed from the end of the side wall 112, so that the bottom wall 11, the side walls 112 and the top wall 113 are surrounded to form a inner cavity 110 connected with the outer side of the fixing base 11.

The fixing base 11 further comprises a holder 114 disposed in the inner cavity 110. The holder 114 has a channel 1140 for the fixing belt 12 passing through and arranging with the holder 114.

The fixing belt 12 is embodied as nylon cable tie in this embodiment to bond the fixing base 11 with the supporter 200.

The top wall 113 has an outer top surface 1131 with multiple third connecting members 115. The third connecting member 115 is similar as the second connecting member 25 adapted to engaged with the first connecting member 24. The third connecting member 115 is formed by third projections 1151 and third recesses 1152.

By pressing the cable 100, the cable 100 is caught inside the cable clamp 20. By pressing the cable clamp 20, the cable clamp 20 is mounted on the mounting base 10. There is no needs of tools during installation process which is easily and quickly to secure the cables 100 to the supporter 200.

The number of the cable 100 on the supporter 200 can be determined according to actual requirements. After determining the number of the cable 100, the cable clamps 20 clamped with the cable 100 are superimposedly mounted, such that the cables 100 are mounted with same distance on the supporter 200.

The cable clamp 20 is made by an injection molding process. The cable clamp 20 is made of PA6 or POM material. In an injection molding process, at a certain temperature, stirring completely melted plastic material, with high pressure intake cavity, after cooled and solidified, the cable clamp 20 is manufactured.

FIG. 7 shows an alternative mode of the above embodiment, the number of the cable clamps 20 mounting on the mounting base 10 can also be adjusted. The cable clamps 20 can be laterally installed along the mounting base 10 with the same distance between the adjacent cable clamps 20. For example, the cable clamps 20 can be arranged to be mounted and shaped as an L, which is three of the cable clamps 20 mounted on the mounting base 10 as the first level and the other two of cable clamps 20 mounted overlapedly on the far left cable clamp 20 of the first level.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention comprises all modifications encompassed within the spirit and scope of the following claims.

What is claimed is:

1. A cable clamp, for mounting at least one cable, comprising:
   a clamping base, which has a through hole;
   at least two supporting arms spacedly extended from said clamping base, wherein each of said supporting arms has a supporting end and an opposed end connected to said clamping base; and
   at least two holding arms disposed intervally to form a holding cavity therebetween for securing the cable between said holding arms, wherein said holding arms are positioned between said supporting arms, wherein said holding arm and said supporting arm are coupled at said supporting end thereof as a fulcrum for said holding arm, wherein each of said holding arms has a mounting end extended out of said supporting end of said supporting arm and a movable end extended into said holding cavity, wherein said cable clamp is adapted for coupling with another cable clamp by engaging said mounting ends of said holding arms of said cable clamp with a through hole of a clamping base of said another cable clamp.

2. The cable clamp, as recited in claim 1, wherein said mounting ends of said holding arms are two hook ends respectively for engaging with said through hole of said clamping base of said another cable clamp.

3. The cable clamp, as recited in claim 2, further comprising a first connecting member disposed on an exposed portion of said supporting end of said supporting arm and a second connecting member disposed on an outer surface of said clamping base, wherein when said mounting ends of holding arms of said cable clamp are engaged with said through hole of said clamping base of said another cable clamp, said first connecting member of said cable clamp is arranged for engaging with a said second connecting member of said another cable clamp.

4. The cable clamp, as recited in claim 3, said first connecting member comprises a plurality of first projections extended from said supporting end and a plurality of first recesses alternating with said first projections, wherein said second connecting member comprises a plurality of second projections provided on said outer surface of said clamping base and a plurality of second recesses alternating with said second projections, thereby when said cable clamp is coupled to said another cable clamp, said first projections and said first recesses of said cable clamp are engaged with second recesses and second projections of said another cable clamp.

5. The cable clamp, as recited in claim 1, wherein each of said holding arms comprises a clamping body defining said mounting end and said movable end, and a stopper wall protruded from said clamping body between said mounting end and said movable end, such that said stopper walls of said holding arms are extended toward each other within said holding cavity.

6. The cable clamp, as recited in claim 5, having a mounting opening formed between said mounting ends communicated with said holding cavity for receiving said cable therein.

7. The cable clamp, as recited in claim 5, wherein said mounting end is shaped as barb.

8. The cable clamp, as recited in claim 2, wherein said two movable ends of said holding arms are facing each other with a gap therebetween.

9. The cable clamp, as recited in claim 5, wherein said two movable ends of said holding arms are facing each other with a gap therebetween.

10. A cable mounting device for mounting at least one cable, comprising:
    at least a first cable clamp and a second cable clamp, wherein each of said first and second cable clamps comprises a clamping base having a through hole, at least one first connecting member and at least two holding arms disposed intervally to form a holding cavity therebetween, wherein said first connecting member is disposed at one end of said holding arm of each of said first and second cable clamps, wherein said first and second cable clamps are adapted to couple with each other when said holding arms of said first cable clamp are engaged with said through hole of said clamping base of said second cable clamp;
    at least one mounting base having at least one hole and comprising a second connecting member disposed around said hole, wherein one of said first and second cable clamps is adapted to couple said at least one mounting base when said holding arms of said one of said first and second cable clamps are engaged with said at least one hole of said mounting base and said second connecting member of said at least one mounting base is engaged with said first connecting member of said one of said first and second cable clamps; and
    at least two supporting arms spacedly extended from each of said clamping bases of said first and second cable clamps, wherein, for each of said clamping bases of said first and second cable clamps, each of said at least two supporting arms has a supporting end and an opposed end connected to said clamping base of each of said first and second cable clamps while said holding arm and said supporting arm are coupled at said supporting end thereof as a fulcrum for said holding arm.

11. The cable mounting device as recited in claim 10, wherein said first connecting member comprises a plurality of first projections formed at said end of said holding arm and a plurality of first recesses alternating with said first projections, wherein said second connecting member comprises a plurality of second projections provided disposed around said hole and a plurality of second recesses alternating with said second projections, when each of said first and second cable clamps is coupled to said at least one mounting base, said first projections and said first recesses of said each of said first and second cable clamps are engaged with said second recesses and said second projections of said mounting base.

12. The cable mounting device as recited in claim 10, wherein said holding arm further has two movable ends formed and extended from said supporting end towards said clamping base, wherein two movable ends are facing each other with a gap therebetween.

13. A cable mounting device for mounting at least one cable, comprising:
    at least a first cable clamp and a second cable clamp, wherein each of said first and second cable clamps comprises a clamping base having a through hole, at least one first connecting member and at least two holding arms disposed intervally to form a holding cavity therebetween, wherein said first connecting member is disposed at one end of said holding arm of each of said first and second cable clamps, wherein said first and second cable clamps are adapted to couple with each other when said holding arms of said first cable clamp are engaged with said through hole of said clamping base of said second cable clamp; and
    at least one mounting base having at least one hole and comprising a second connecting member disposed around said hole, wherein one of said first and second cable clamps is adapted to couple said at least one mounting base when said holding arms of said one of said first and second cable clamps are engaged with said at least one hole of said mounting base and said second connecting member of said at least one mounting base is engaged with said first connecting member of said one of said first and second cable clamps;
    wherein said first connecting member comprises a plurality of first projections formed at said end of said holding arm and a plurality of first recesses alternating with said first projections, wherein said second connecting member comprises a plurality of second projections provided disposed around said hole and a plurality of second recesses alternating with said second projections, when each of said first and second cable clamps is coupled to said at least one mounting base, said first projections and said first recesses of said each of said first and second cable clamps are engaged with said second recesses and said second projections of said mounting base.

14. A cable mounting device for mounting at least one cable, comprising:
    at least a first cable clamp and a second cable clamp, wherein each of said first and second cable clamps comprises a clamping base having a through hole, at least one first connecting member and at least two holding arms disposed intervally to form a holding cavity therebetween, wherein said first connecting member is disposed at one end of said holding arm of each of said first and second cable clamps, wherein said first and second cable clamps are adapted to couple with each other when said holding arms of said first cable clamp are engaged with said through hole of said clamping base of said second cable clamp; and
    at least one mounting base having at least one hole and comprising a second connecting member disposed around said hole, wherein one of said first and second cable clamps is adapted to couple said at least one mounting base when said holding arms of said one of said first and second cable clamps are engaged with said at least one hole of said mounting base and said second connecting member of said at least one mounting base is engaged with said first connecting member of said one of said first and second cable clamps, wherein at least one supporting arm is extended from each of said clamping bases of said first and second cable clamps, wherein said holding arm of said first cable clamp has a mounting end extended along said at least one supporting arm protrudedly and adapted to be engaged with said through hole of said second cable clamp.

15. The cable mounting device as recited in claim 14, wherein each of said first and second cable clamps has a mounting opening formed between said mounting ends communicated with said holding cavity for receiving said at least one cable therein.

16. The cable mounting device as recited in claim 15, wherein said mounting ends of said holding arms are two hook ends respectively.

17. The cable mounting device as recited in claim 14, wherein said holding arm further has two movable ends formed and extended from said mounting end towards said clamping base, wherein two movable ends are facing each other with a gap therebetween.

18. A cable mounting device for mounting at least one cable, comprising:
at least a first cable clamp and a second cable clamp, wherein each of said first and second cable clamps comprises a clamping base having a through hole, at least one first connecting member and at least two holding arms disposed intervally to form a holding cavity therebetween, wherein said first connecting member is disposed at one end of said holding arm of each of said first and second cable clamps, wherein said first and second cable clamps are adapted to couple with each other when said holding arms of said first cable clamp are engaged with said through hole of said clamping base of said second cable clamp; and
at least one mounting base having at least one hole and comprising a second connecting member disposed around said hole, wherein one of said first and second cable clamps is adapted to couple said at least one mounting base when said holding arms of said one of said first and second cable clamps are engaged with said at least one hole of said mounting base and said second connecting member of said at least one mounting base is engaged with said first connecting member of said one of said first and second cable clamps, wherein at least one supporting arm is extended from each of said clamping bases of said first and second cable clamps, wherein said holding arm of each of said first and second cable clamps has a mounting end extended along said supporting arm protrudedly and adapted to be engaged with said hole of said mounting base.

19. A cable mounting device for mounting at least one cable, comprising:
at least a first cable clamp and a second cable clamp, wherein each of said first and second cable clamps comprises a clamping base having a through hole, at least one first connecting member and at least two holding arms disposed intervally to form a holding cavity therebetween, wherein said first connecting member is disposed at one end of said holding arm of each of said first and second cable clamps, wherein said first and second cable clamps are adapted to couple with each other when said holding arms of said first cable clamp are engaged with said through hole of said clamping base of said second cable clamp; and
at least one mounting base having at least one hole and comprising a second connecting member disposed around said hole, wherein one of said first and second cable clamps is adapted to couple said at least one mounting base when said holding arms of said one of said first and second cable clamps are engaged with said at least one hole of said mounting base and said second connecting member of said at least one mounting base is engaged with said first connecting member of said one of said first and second cable clamps, wherein said second connecting member of said at least one mounting base is further disposed on an outer surface of said clamping base of one of said first and second cable clamps, wherein when two of said first and second cable clamps are coupled with each other, said first connecting member of said first cable clamp is engaged with said second connecting member of said at least one mounting base.

* * * * *